United States Patent [19]

Fujimura

[11] Patent Number: 5,030,384
[45] Date of Patent: * Jul. 9, 1991

[54] LIQUID CRYSTAL COMPOSITION
[75] Inventor: Koh Fujimura, Tokyo, Japan
[73] Assignee: Casio Computer Co., Ltd., Tokyo, Japan
[*] Notice: The portion of the term of this patent subsequent to Apr. 26, 2005 has been disclaimed.
[21] Appl. No.: 559,505
[22] Filed: Jul. 20, 1990

Related U.S. Application Data

[63] Continuation of Ser. No. 186,376, Apr. 26, 1988, abandoned, which is a continuation of Ser. No. 762,615, Aug. 5, 1985, Pat. No. 4,759,870.

[30] Foreign Application Priority Data

Aug. 14, 1984 [JP] Japan ................................ 59-168818
Jan. 19, 1985 [JP] Japan .................................. 60-8254

[51] Int. Cl.$^5$ ............................................................ C09K 19/30
[52] U.S. Cl. ............................ 252/299.63; 252/299.5; 252/299.65; 252/299.01
[58] Field of Search ............. 252/299.5, 299.63, 299.65

[56] References Cited

U.S. PATENT DOCUMENTS

| | | | |
|---|---|---|---|
| 4,017,416 | 4/1977 | Inukai et al. | 252/299.65 |
| 4,149,413 | 4/1979 | Gray et al. | 252/299.65 |
| 4,222,887 | 9/1980 | Matsufuji | 252/299.65 |
| 4,229,315 | 10/1980 | Krause et al. | 252/299.63 |
| 4,279,770 | 7/1981 | Inukai et al. | 252/299.63 |
| 4,293,434 | 10/1981 | Deutscher et al. | 252/299.63 |
| 4,340,498 | 6/1982 | Sugimori | 350/350 R |
| 4,372,871 | 2/1983 | Toriyama et al. | 252/299.63 |
| 4,387,038 | 6/1983 | Fukui et al. | 252/299.63 |
| 4,387,039 | 6/1983 | Sugimori | 350/350 R |
| 4,399,298 | 8/1983 | Sugimori | 252/299.5 |
| 4,424,371 | 1/1984 | Hsu | 252/299.63 |
| 4,460,770 | 7/1984 | Petrzilka | 252/299.6 |
| 4,559,161 | 12/1985 | Takei | 350/350 R |
| 4,566,759 | 1/1986 | McDonnell et al. | 350/350 R |
| 4,622,162 | 11/1986 | Kimura et al. | 252/299.63 |
| 4,670,182 | 6/1987 | Fujita et al. | 252/299.63 |
| 4,688,899 | 8/1987 | Fujimura et al. | 252/299.01 |
| 4,704,005 | 11/1987 | Buller et al. | 252/299.63 |
| 4,729,639 | 3/1988 | Hubbard | 252/299.5 |
| 4,737,312 | 4/1988 | Matsumoto et al. | 252/299.5 |
| 4,740,328 | 4/1988 | Fujimura | 252/299.63 |
| 4,759,870 | 7/1988 | Fujimura | 252/299.63 |
| 4,855,076 | 8/1989 | Goto et al. | 252/299.63 |
| 4,886,621 | 12/1989 | Sage et al. | 252/299.63 X |

FOREIGN PATENT DOCUMENTS

| | | | |
|---|---|---|---|
| 0019665 | 12/1980 | European Pat. Off. | 252/299.63 |
| 57-05782 | 1/1982 | Japan | 252/299.63 |
| 5705780 | 1/1982 | Japan | 252/299.63 |
| 58-118886 | 7/1983 | Japan | 252/299.63 |
| 58-194972 | 11/1983 | Japan | 252/299.63 |
| 2085910 | 10/1980 | United Kingdom | 252/299.63 |

Primary Examiner—John S. Maples
Assistant Examiner—Richard Treanor
Attorney, Agent, or Firm—Frishauf, Holtz, Goodman & Woodward

[57] ABSTRACT

A liquid crystal composition, comprising: a first liquid crystal material comprising 20 to 70% by weight, based on the total weight of the composition, of at least one liquid crystal compound of the formula:

$$R^1-\underset{H}{\bigcirc}-COO-\bigcirc-OR^2 \qquad (I)$$

wherein each of $R^1$ and $R^2$ is independently an alkyl group having 1 to 8 carbon atoms.
a second liquid crystal material comprising at least two kinds of liquid crystal compounds selected from compounds of the formulas:

$$R-\underset{H}{\bigcirc}-\bigcirc-COO-\bigcirc-CN \qquad (VII)$$

$$R-\bigcirc-\bigcirc-COO-\bigcirc-CN \qquad (VIII)$$

and $$R-\underset{H}{\bigcirc}-\bigcirc-COO-\underset{\underset{}{}}{\overset{Cl}{\bigcirc}}-CN \qquad (IX)$$

wherein R is independently an alkyl group having 1 to 8 carbon atoms, the amounts of compounds (VII), (VIII) and (IX), based on the total weight of the composition, being up to 20% by weight, up to 20% by weight, and up to 10% by weight, respectively, and
a third liquid crystal material comprising 2 to 15% by weight, based on the total weight of the composition, of one kind of liquid crystal compound selected from compounds of the formulas:

$$R^1-\underset{H}{\bigcirc}-COO-\underset{\underset{CN}{}}{\overset{}{\bigcirc}}-OR^2 \qquad (XIV)$$

and $$R^1-\underset{H}{\bigcirc}-\bigcirc-COO-\underset{\underset{CN}{}}{\overset{}{\bigcirc}}-OR^2 \qquad (XV)$$

wherein each of $R^1$ and $R^2$ is independently an alkyl group having 1 to 8 carbon atoms.

20 Claims, No Drawings

LIQUID CRYSTAL COMPOSITION

This application is a continuation of application Ser. No. 07/186,376, filed Apr. 26, 1988 now abandoned; which is a continuation of Ser. No. 06/762,615 (now U.S. Pat. No. 4,759,870), which is a continuation of application Ser. No. 762,615 filed Aug. 5, 1985, now U.S. Pat. No. 4,759,570.

BACKGROUND OF THE INVENTION

1. Field of the Invention

The present invention relates to a liquid crystal composition and, more particularly, to a liquid crystal composition which can be suitably adapted in a liquid crystal device controlled by a two frequency addressing scheme.

2. Description of the Prior Art

More liquid crystal devices are recently being used in television sets, computer terminal devices and OA equipment. In many such liquid crystal devices, a number of pixels are arranged in a matrix form and are time-divisionally driven. In a liquid crystal device of this type, when the number of pixels increases, the number of scanning lines increases and the time-division number also increases. For this reason, the contrast between ON/OFF pixels cannot be kept high enough due to the cross effect phenomenon or the like. In addition, liquid crystal devices of this type have only a slow response speed when assembled in a computer terminal device or OA equipment.

In view of this problem, the two frequency addressing scheme utilizing the dielectric dispersion phenomenon of a liquid crystal has been proposed. In this scheme, a signal voltage of a high frequency (e.g., 100 kHz) is applied to a liquid crystal so as to align the liquid crystal molecular axis perpendicular to an electric field, and a signal voltage of a low frequency (e.g., 200 Mz) is applied so as to align the liquid crystal molecular axis parallel to the electric field. In accordance with this scheme, the time-division number can be increased, and quick response can be obtained.

As a liquid crystal for use in a liquid crystal device driven by the two frequency addressing scheme, Japanese Patent Disclosure No. 57-83577 discloses a liquid crystal composition consisting of various liquid crystal compounds.

However, when conventional liquid crystal compositions, including the one disclosed in the above-mentioned Disclosure, are driven by the two frequency addressing scheme, the response characteristic upon application of an electric field of low frequency is degraded if an electric field of high frequency has been applied to the liquid crystal for a considerable period of time. As described above, when high- and low-frequency electric fields are applied, liquid crystal molecules are aligned parallel and perpendicular to the substrate. However, it should be noted that liquid crystal molecules are not completely aligned parallel or perpendicular to the substrate but are slightly inclined with respect thereto.

When a high-frequency electric field is applied for an extended period of time, liquid crystal molecules are aligned almost parallel to the substrate. When a low-frequency electric field is subsequently applied, liquid crystal molecules cannot immediately be aligned vertically (high-frequency hysteresis effect). When a positive display TN-type liquid crystal device is driven by the two frequency addressing scheme, the operation for closing the shutter is delayed. When a guest-host type liquid crystal device is driven by the two frequency addressing scheme, the operation for opening the shutter is delayed.

Conventional liquid crystal compositions have a response time of, at best, 1 msec. As such, conventional liquid crystal compositions cannot be used to obtain high-speed computer terminal devices or OA equipment.

Moreover, conventional two frequency addressing liquid crystal compositions have a high drive voltage (e.g., 30 V) and a small tolerance for high breakdown voltages for semiconductor ICs constituting drivers.

SUMMARY OF THE INVENTION

It is, therefore, an object of the present invention to provide a two frequency addressing liquid crystal composition which is less prone to the high-frequency hysteresis effect.

It is another object of the present invention to provide a two frequency addressing liquid crystal composition which can be driven at a low voltage and which has a quick response time.

In order to achieve the above objects of the present invention, there is provided a two frequency addressing liquid crystal composition comprising a plurality of liquid crystal compounds mixed such that the absolute value of a dielectric anisotropy ($\Delta\epsilon L$) of the composition, measured at a low frequency 1/10 a cross-over frequency of the composition, is larger than the absolute value of a dielectric anisotropy ($\Delta\epsilon H$) of the composition measured at a high frequency 10 times the cross-over frequency.

According to a preferred aspect of the present invention, a liquid crystal composition comprises:

a first liquid crystal material of at least one member selected from the group consisting of liquid crystal compounds represented by general formulas:

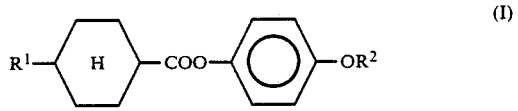

(I)

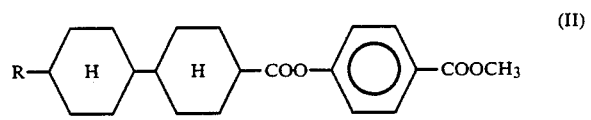

(II)

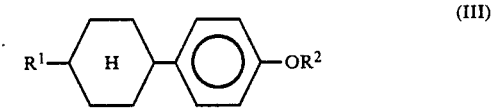

(III)

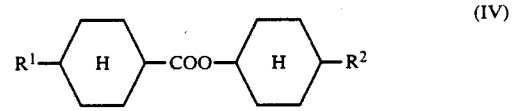

(IV)

and

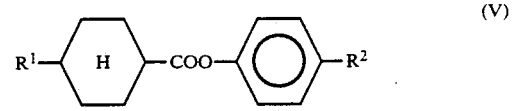

(V)

(wherein each of R, $R^1$ and $R^2$ is independently an alkyl group having 1 to 8 carbon atoms);

a second liquid crystal material of at least one member selected from the group consisting of liquid crystal compounds represented by general formulas:

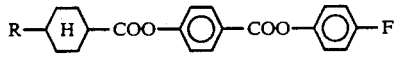 (VI)

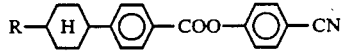 (VII)

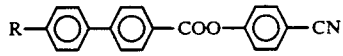 (VIII)

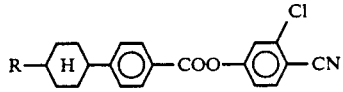 (IX)

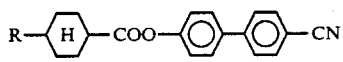 (X)

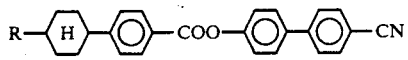 (XI)

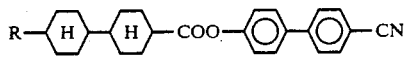 (XII)

and

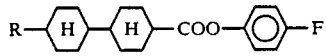 (XIII)

(wherein each R is independently an alkyl group having 1 to 8 carbon atoms);

a third liquid crystal material of at least one member selected from the group consisting of liquid crystal compounds represented by general formulas:

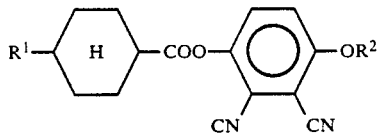 (XIV)

and

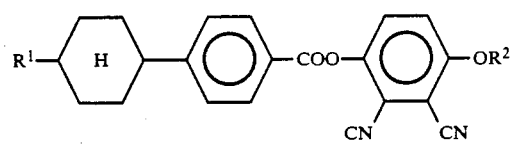 (XV)

(wherein each of $R^1$ and $R^2$ is independently an alkyl group having 1 to 8 carbon atoms); and, optionally, a fourth liquid crystal material of at least one member selected from the group consisting of liquid crystal compounds represented by general formulas:

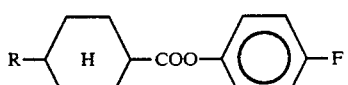 (XVI)

and

-continued

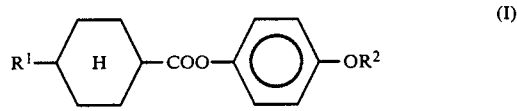 (XVII)

(wherein each of R, $R^1$ and $R^2$ is independently an alkyl group having 1 to 8 carbon atoms).

DETAILED DESCRIPTION OF THE PREFERRED EMBODIMENTS

The present inventors made extensive studies in order to find a liquid crystal composition which can be suitably adapted in a liquid crystal device driven by the two frequency addressing scheme, and which is less prone to the high-frequency hysteresis effect. As a result of such studies, the present inventors found that such a liquid crystal composition can be obtained by mixing a plurality of liquid crystal compounds in a mixing ratio such that the absolute value of a dielectric anisotropy ($\Delta\epsilon L$), measured at a low frequency (fL) 1/10 a cross-over frequency fc (i.e., a frequency at which the dielectric anisotropy $\Delta\epsilon$ is 0) of the objective composition, is larger than the absolute value of a dielectric anisotropy ($\Delta\epsilon H$) measured at a high frequency (fH) 10 times the cross-over frequency fc.

More specifically, according to the present invention, various liquid crystal compounds are mixed with a base liquid crystal compound having excellent miscibility and a low viscosity.

The base liquid crystal compound need have neither a high dielectric anisotropy (this can be about +1.0 to −1.5), or a dielectric dispersion property. The base liquid crystal compound should, preferably, be selected from the specific liquid crystal compounds having the following general formulas:

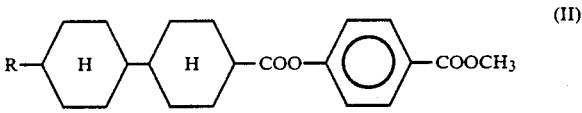 (I)

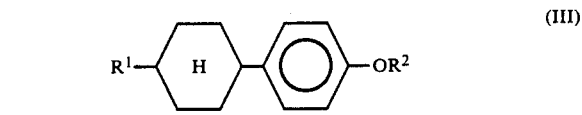 (II)

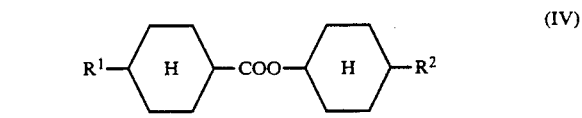 (III)

(IV)

and (V)

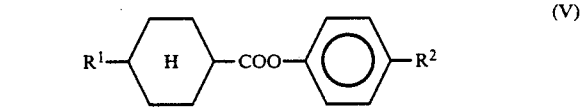

(wherein each of R, $R^1$ and $R^2$ is independently an alkyl group having 1 to 8 carbon atoms). This liquid crystal material is referred to as the first liquid crystal material.

A liquid crystal compound having a large positive dielectric anisotropy ($\Delta\epsilon L$; e.g., $+5$ to $+35$), measured at a frequency 1/10 the cross-over frequency fc) lower than the cross frequency fc, and a relatively small dielectric anisotropy (about $-1.5$ to $-2.5$), measured at a frequency (10 times the cross-over frequency fc) higher than the cross frequency fc, is added to the base liquid crystal compound. This liquid crystal compound imparts the dielectric dispersion property to the objective liquid crystal composition and has, preferably, been selected from the liquid crystal compounds represented by the following general formulas:

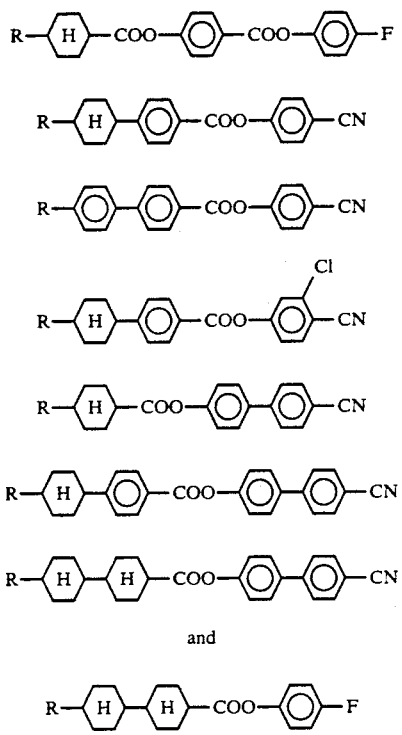

and (wherein each R is independently an alkyl group having 1 to 8 carbon atoms). One or more of these compounds can be used, compounds selected from the above compounds being referred to as the second liquid crystal material.

The second liquid crystal material has a cross-over frequency fc of several kilohertz to several hundreds of kilohertz.

Of the compounds which can be used as the second liquid crystal material, a liquid crystal compound represented by general formula (VI) has a large dielectric anisotropy $\Delta\epsilon$ change range with respect to a change in the frequency of the applied electric field. Therefore, this liquid crystal compound can both increase the absolute value of the dielectric anisotropy of a liquid crystal composition containing the compound, and can also impart a quick response characteristic to such a composition. This liquid crystal compound has a low cross-over frequency which is substantially equivalent to those of other second liquid crystal material compounds. Therefore, even if this liquid crystal material is used, the cross-over frequency of the objective liquid crystal composition will not be increased.

Thus, if a liquid crystal composition having a particularly quick response time is to be obtained, the second liquid crystal material should, preferably, contain a liquid crystal compound represented by general formula (VI).

The liquid crystal composition according to the present invention contains another liquid crystal compound which has a high viscosity (i.e., a high nematic-isotropic phase transition point (N-I) point) so as to increase the mesomorphic phase temperature, and a large negative dielectric anisotropy $\Delta\epsilon$. Thus, this liquid crystal compound decreases the dielectric anisotropy of the objective liquid crystal composition in the negative direction, in addition to decreasing the cross-over frequency fc of the composition. Preferably, this liquid crystal compound is of at least one member selected from the group consisting of liquid crystal compounds represented by general formulas:

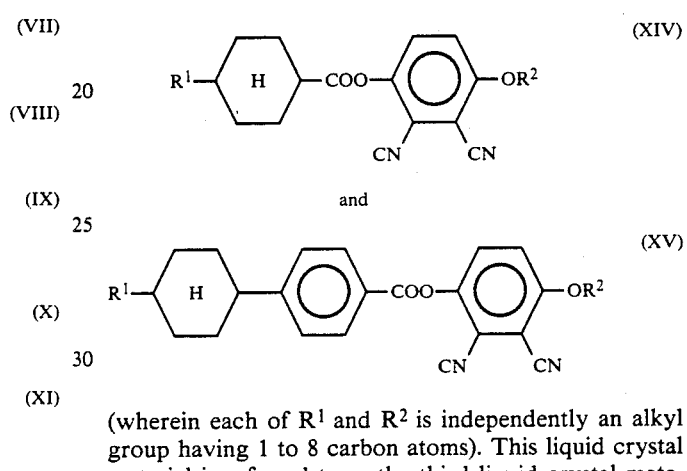

(wherein each of $R^1$ and $R^2$ is independently an alkyl group having 1 to 8 carbon atoms). This liquid crystal material is referred to as the third liquid crystal material.

The third liquid crystal material contains, preferably, at least one compound represented by general formula (XV).

The liquid crystal composition of the present invention need consist of only the three types of liquid crystal materials described above. However, if the viscosity of the liquid crystal composition becomes too high by addition of only the second liquid crystal material, or, if the dielectric anisotropy characteristic is poor, a fourth liquid crystal material can also be added. Preferably, the fourth liquid crystal material is of at least one member selected from the group consisting of liquid crystal compounds represented by general formulas:

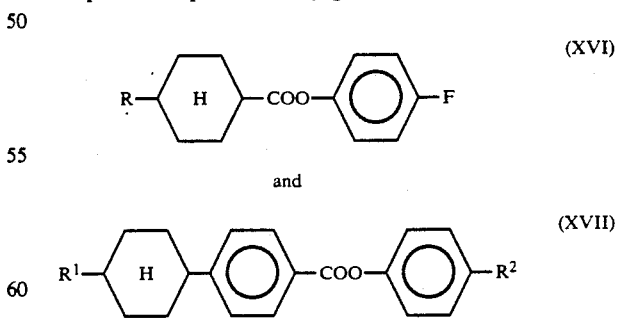

(wherein each of R, $R^1$ and $R^2$ is independently an alkyl group having 1 to 8 carbon atoms). The fourth liquid crystal material does not exhibit a dielectric dispersion property. A liquid crystal compound of general formula (XVI) has a low viscosity and a dielectric anisotropy $\Delta\epsilon$ of about $+3$. A liquid crystal compound of general formula (XVII) has a relatively low viscosity and a dielectric anisotropy $\Delta\epsilon$ of about $-1$.

The liquid crystal compounds used in the present invention are known per se.

The mixing ratio of the four types of liquid crystal materials described above is based on the total weight of the liquid crystal composition, and is generally selected such that the composition contains 30 to 70% of the first liquid crystal material, 2 to 60% of the second liquid crystal material, 2 to 15% of the third liquid crystal material, and 0 to 15% of the fourth liquid crystal material.

As described above, when the first liquid crystal material includes a liquid crystal compound of general formula (I), the content of the first liquid crystal material must satisfy the above requirement, the compound of general formula (I) being contained, preferably, in the amount of 20 to 70%. When the third liquid crystal material includes a liquid crystal compound of general formula (XV), the compound is contained, preferably, in the amount of 2 to 15%.

According to a first preferred aspect of the present invention (a liquid crystal composition having a lower viscosity), it is particularly preferable that the first liquid crystal material contain at least one type of liquid crystal compound of general formulas (I) and (II), respectively; the second liquid crystal material contain at least one type of liquid crystal compound of general formulas (VII), (VIII) and (XIII), respectively; the third liquid crystal material contain at least one type of liquid crystal compound of general formula (XV): and the fourth liquid crystal material contain at least one type of liquid crystal compound of general formula (XVI). Furthermore, according to this aspect of the present invention, it is particularly preferable that the compounds of general formulas (I) and (II) be contained in a total amount of 30 to 40%; the liquid crystal compounds of general formulas (VII), (VIII) and (XIII) be contained in a total amount of 40 to 50%: the liquid crystal compound of general formula (XV) be contained in the amount of 5 to 15%: and the liquid crystal compound of general formula (XVI) be contained in the amount of 5 to 15%.

According to the first aspect of the present invention, the compounds of general formulas (I) to (XVII) satisfy the above requirements provided they meet the following requirements. The requirements are that the compound of general formula (I) be contained in the amount of 20 to 70%, the compound of general formula (II) be contained in the amount of 0 to 30%, the compound of general formula (III) be contained in the amount of 0 to 30%, the compound of general formula (IV) be contained in the amount of 0 to 30%, the compound of general formula (V) be contained in the amount of 0 to 50%, the compound of general formula (VII) be contained in the amount of 0 to 20%, the compound of general formula (VIII) be contained in the amount of 0 to 20%, the compound of general formula (IX) be contained in the amount of 0 to 10%, the compound of general formula (X) be contained in the amount of 0 to 15%, the compound of general formula (XI) be contained in the amount of 0 to 20%, the compound of general formula (XII) be contained in the amount of 0 to 10%, the compound of general formula (XIII) be contained in the amount of 0 to 20%, the compound of general formula (XIV) be contained in the amount of 2 to 15%, the compound of general formula (XV) be contained in the amount of 2 to 15%, the compound of general formula (XVI) be contained in the amount of 0 to 30%, and the compound of general formula (XVII) be contained in the amount of 0 to.15%.

According to a second preferred aspect (a liquid crystal composition having a particularly quick response time) of the present invention, it is particularly preferable that the first liquid crystal material contain at least one type of liquid crystal compound of general formula (I); the second liquid crystal material contain at least one type of compound of general formulas (VI), (VII) and (VIII), respectively, and, optionally, at least one type of compound of general formula (XIII); the third liquid crystal material contain at least one type of compound of general formula (XV); and, optionally, the fourth liquid crystal material contain at least one type of compound of general formula (XVI). Furthermore, according to the second preferred aspect, it is particularly preferable that the compound of general formula (I) be contained in the amount of 40 to 65%, the compounds of general formulas (VI), (VII), (VIII) and (XIII) be contained in a total amount of 2 to 40%; the compound of general formula (XV) be contained in the amount of 2 to 15%; and the compound of general formula (XVI) be contained in the amount of 0 to 15%.

In this case, an optimal effect is obtained if the second liquid crystal material contains 2 to 20% of a compound of general formula (VI), 10 to 20% of a compound of general formula (VII), 5 to 20% of a compound of general formula (VIII), and 0 to 10% of a compound of general formula (XIII).

In the second aspect of the present invention, provided that the above requirements are satisfied, the compounds of general formulas (I) to (XVII) will satisfy the following requirements. The requirements are that the compound of general formula (I) be contained in the amount of 20 to 70%, the compound of general formula (II) be contained in the amount of 0 to 30%, the compound of general formula (III) be contained in the amount of 0 to 30%, the compound of general formula (IV) be contaIned in the amount of 0 to 30%, the compound of general formula (V) be contained in the amount of 0 to 50%, the compound of general formula (VI) be contained in the amount of 2 to 20%, the compound of general formula (VII) be contained in the amount of 0 to 20%, the compound of general formula (VIII) be contained in the amount of 0 to 20%, the compound of general formula (IX) be contained in the amount of 0 to 10%, the compound of general formula (X) be contained in the amount of 0 to 15%, the compound of general formula (XI) be contained in the amount of 0 to 20%, the compound of general formula (XII) be contained in the amount of 0 to 10%, the compound of general formula (XIII) be contained in the amount of 0 to 20%, the compound of general formula (XIV) be contained in the amount of 2 to 15%, the compound of general formula (XV) be contained in the amount of 2 to 15%, the compound of general formula (XVI) be contained in the amount of 0 to 30%, and the compound of general formula (XVII) be contained in the amount of 0 to 15%.

The present invention will now be described by way of Examples.

EXAMPLES 1-11

The liquid crystal compounds indicated in Table 1 were mixed in the amounts shown therein to prepare 11 types of liquid crystal compositions. Liquid crystal cells were manufactured using these liquid crystal compositions and were driven at 25 Volts at two frequencies of 200 Hz and 100 kHz. The dielectric anisotropies $\Delta\epsilon$ and the cross-over frequencies fc (measuring temperature: 25° C.) of the compositions are shown in Table 2. The viscosities (measuring temperature: 25° C.) of the compositions are also shown in Table 2. The rise and decay times of the respective compositions were less than 0.5 msec. None of the compositions froze when left to stand in a freezer at 0° C. for 4 days (C-N point or S-N point: lower than 0° C.). The N-I points of some compositions are shown in Table 3.

TABLE 1

| Liquid Crystal Compound | | | Example No. (Parts by Weight) | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| First Liquid Crystal Material | (I) | C₃H₇—⟨H⟩—COO—⟨○⟩—OC₂H₅ | 18 | 5 | 7 | 9 | 8 | 2 | 8 | 14 | 8 | 16 | 7 |
| | | C₃H₇—⟨H⟩—COO—⟨○⟩—OC₄H₉ | 17 | 6 | 8 | 10 | 8 | 3 | 8 | 13 | 8 | 16 | 7 |
| | | C₄H₉—⟨H⟩—COO—⟨○⟩—OCH₃ | | | 5 | 7 | 9 | | | 2 | | | |
| | | C₄H₉—⟨H⟩—COO—⟨○⟩—OC₂H₅ | 17 | 6 | 8 | 10 | 7 | 3 | 7 | 13 | 7 | 16 | 7 |
| | | C₄H₉—⟨H⟩—COO—⟨○⟩—OC₄H₉ | | | 5 | 7 | 9 | | | 2 | | | |
| | | C₅H₁₁—⟨H⟩—COO—⟨○⟩—OCH₃ | | | 6 | 8 | 10 | | | 3 | | | |
| | | C₅H₁₁—⟨H⟩—COO—⟨○⟩—OC₂H₅ | | | 4 | 5 | 7 | | | 2 | | | |
| | (II) | C₃H₇—⟨H⟩—⟨H⟩—COO—⟨○⟩—COOCH₃ | | 12 | | | | 10 | 12 | | 10 | | 7 |
| | | C₅H₁₁—⟨H⟩—⟨H⟩—COO—⟨○⟩—COOCH₃ | | 12 | | | | 10 | 12 | | 10 | | 7 |
| | (III) | C₃H₇—⟨H⟩—⟨○⟩—OC₂H₅ | | | | | | | | 8 | | | |
| | | C₃H₇—⟨H⟩—⟨○⟩—OC₄H₉ | | | | | | | | | 7 | | |
| Second Liquid Crystal Material | (VII) | C₂H₅—⟨H⟩—⟨○⟩—COO—⟨○⟩—CN | | 8 | 5 | 6 | 5 | 8 | | | 5 | | 8 |

TABLE 1-continued

| Liquid Crystal Compound | | Example No. (Parts by Weight) | | | | | | | | | | |
|---|---|---|---|---|---|---|---|---|---|---|---|---|
| | | 1 | 2 | 3 | 4 | 5 | 6 | 7 | 8 | 9 | 10 | 11 |
| $C_5H_{11}$—H—⬡—COO—⬡—CN | | 10 | 7 | 5 | 6 | 5 | 7 | | 10 | 5 | 7 | 7 |
| (VIII) $C_5H_{11}$—⬡—⬡—COO—⬡—CN | | | 7 | 5 | 3 | 5 | 7 | 5 | | 5 | | 7 |
| $C_7H_{15}$—⬡—⬡—COO—⬡—CN | | | 6 | 5 | 3 | 5 | 6 | 5 | | 5 | 8 | 6 |
| (IX) $C_3H_7$—H—⬡—COO—⬡(Cl)—CN | | | | | | | | | 5 | | 5 | |
| $C_5H_{11}$—H—⬡—COO—⬡(Cl)—CN | | 5 | | | | | | | 5 | 5 | 5 | |
| (XI) $C_3H_7$—H—⬡—COO—⬡—⬡—CN | | 5 | | 5 | 5 | 7 | | 7 | 5 | | 5 | |
| $C_5H_{11}$—H—⬡—COO—⬡—⬡—CN | | 5 | | 5 | 5 | 7 | | 7 | 5 | | 5 | |
| (XII) $C_3H_7$—H—H—COO—⬡—⬡—CN | | | | | 2 | | | | | | | |
| $C_5H_{11}$—H—H—COO—⬡—⬡—CN | | | | | 2 | | | | | | | |
| (XIII) $C_3H_7$—H—H—COO—⬡—F | | 8 | 8 | | 8 | 5 | 8 | 8 | 8 | 8 | | 8 |
| $C_5H_{11}$—H—H—COO—⬡—F | | 7 | 7 | | | 7 | 5 | 7 | 7 | 7 | 7 | 7 |
| Third Liquid Crystal Material (XIV) $C_3H_7$—H—COO—⬡($CN$,$CN$)—$OC_5H_{11}$ | | 4 | | | | | | | 5 | 6 | | |

TABLE 1-continued

| Liquid Crystal Compound | | | Example No. (Parts by Weight) | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| | C$_4$H$_9$–[H]–COO–[Ph(CN)(CN)]–OC$_5$H$_{11}$ | | | | | 4 | | | | | 5 | 6 | | |
| (XV) | C$_3$H$_7$–[H]–[Ph]–COO–[Ph(CN)(CN)]–OC$_4$H$_9$ | | | 2 | 2 | 2 | | 2 | | | 3 | | 4 | |
| | C$_3$H$_7$–[H]–[Ph]–COO–[Ph(CN)(CN)]–OC$_5$H$_{11}$ | | | 2 | 2 | 2 | | 2 | | | 3 | | 4 | |
| | C$_5$H$_{11}$–[H]–[Ph]–COO–[Ph(CN)(CN)]–OC$_4$H$_9$ | | | | | | | | | | | | 3 | 4 |
| | C$_4$H$_9$–[H]–[Ph]–COO–[Ph(CN)(CN)]–OC$_4$H$_9$ | | | | | | 4 | | 4 | | | | | |
| (XV) | C$_3$H$_7$–[H]–[Ph]–COO–[Ph(CN)(CN)]–OC$_2$H$_5$ | | | | | | 3 | | | | | | | |
| | C$_2$H$_5$–[H]–[Ph]–COO–[Ph(CN)(CN)]–OC$_3$H$_7$ | | | | | | 3 | | | | | 3 | | |
| | C$_2$H$_5$–[H]–[Ph]–COO–[Ph(CN)(CN)]–OC$_2$H$_5$ | | | | | | | | | 3 | | | | |
| | C$_5$H$_{11}$–[H]–[Ph]–COO–[Ph(CN)(CN)]–OC$_5$H$_{11}$ | | | | | | | | | 3 | | | | |
| Fourth Liquid Crystal Material | (XVI) | C$_5$H$_{11}$–[H]–COO–[Ph]–F | | | | | | 5 | 8 | | | | | 5 |

TABLE 1-continued

| Liquid Crystal Compound | Example No. (Parts by Weight) | | | | | | | | | | |
|---|---|---|---|---|---|---|---|---|---|---|---|
| | 1 | 2 | 3 | 4 | 5 | 6 | 7 | 8 | 9 | 10 | 11 |
| 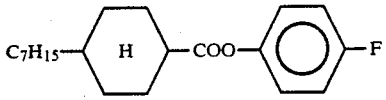 | | 5 | 8 | | | | | | | | 5 |
| (XVII) 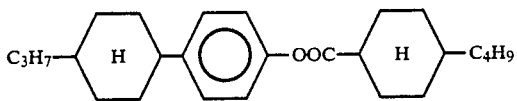 | | | | | | | | | 5 | | |
| 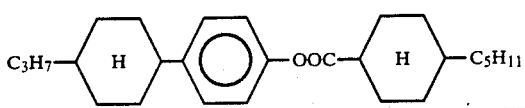 | | | | | | | | | | 5 | |

TABLE 2

| Example | Δε (200 Hz) | Δε (100 kHz) | fc (kHz) | Viscosity at 25° C. (cP) |
|---|---|---|---|---|
| 1 | +5.2 | −3.6 | 9.5 | 71.7 |
| 2 | +6.8 | −3.0 | 25.0 | 90.8 |
| 3 | +7.3 | −1.7 | 24.0 | 51.0 |
| 4 | +6.3 | −2.0 | 10.0 | 61.8 |
| 5 | +6.2 | −2.2 | 9.0 | 57.6 |
| 6 | +5.5 | −3.0 | 20.0 | 50.6 |
| 7 | +8.7 | −2.3 | 16.0 | 68.9 |
| 8 | +4.7 | −4.0 | 7.0 | 98.8 |
| 9 | +7.4 | −3.9 | 19.0 | 66.9 (30° C.) |
| 10 | +4.3 | −4.4 | 5.5 | 85.9 |
| 11 | +6.4 | −3.3 | 19.0 | 70.5 |

TABLE 3

| Example No. | N-I point (°C.) |
|---|---|
| 1 | 125.5 |
| 4 | 137.0 |
| 8 | 137.3 |

TABLE 3-continued

| Example No. | N-I point (°C.) |
|---|---|
| 10 | 125.9 |

EXAMPLES 12–15

The liquid crystal compounds indicated in Table 4 were mixed in the amounts shown therein to prepare 4 types of liquid crystal compositions. Liquid crystal cells were prepared using these compositions and were driven at 25 volts at two frequencies of 200 Hz and 100 kHz. The dielectric anisotropies Δε and cross-over frequencies fc (measuring temperature: 25° C.) of the compositions are shown in Table 5. The viscosities (measuring temperature: 25° C.) and the N-I points of the respective compositions are also shown in Table 5. The rise and decay times of the respective compositions were less than 0.5 msec. None of the compositions froze when left to stand in a freezer at 0° C. for 4 days (C-N point or S-N point: lower than 0° C.).

TABLE 4

| | Liquid crystal compound | Example No. (% by weight) | | | |
|---|---|---|---|---|---|
| | | 12 | 13 | 14 | 15 |
| First Liquid Crystal Material (I) | | 8 | 8 | 8 | 7 |
| | | 9 | 9 | 9 | 8 |
| | | 8 | 8 | 7 | 6 |
| | | 9 | 9 | 8 | 7 |

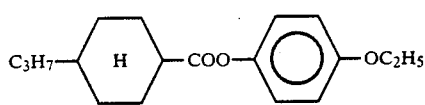

TABLE 4-continued

| | | Liquid crystal compound | Example No. (% by weight) | | | |
|---|---|---|---|---|---|---|
| | | | 12 | 13 | 14 | 15 |
| | | C$_4$H$_9$—(H)—COO—◯—OC$_4$H$_9$ | 8 | 7 | 7 | 6 |
| | | C$_5$H$_{11}$—(H)—COO—◯—OCH$_3$ | 9 | 8 | 8 | 7 |
| | | C$_5$H$_{11}$—(H)—COO—◯—OC$_2$H$_5$ | 6 | 5 | 5 | 4 |
| Second Liquid Crystal Material | (VI) | C$_2$H$_5$—(H)—COO—◯—COO—◯—F | | | 5 | 4 |
| | | V$_3$H$_7$—(H)—COO—◯—COO—◯—F | 10 | | 8 | 3 |
| | | C$_7$H$_{15}$—(H)—COO—◯—COO—◯—F | | | 7 | 3 |
| | (VII) | C$_2$H$_5$—(H)—◯—COO—◯—CN | 8 | 8 | 8 | 8 |
| | | C$_5$H$_{11}$—(H)—◯—COO—◯—CN | 7 | 7 | 7 | 7 |
| | (VIII) | C$_5$H$_{11}$—◯—◯—COO—◯—CN | 10 | 7 | 5 | 5 |
| | | C$_7$H$_{15}$—◯—◯—COO—◯—CN | | 6 | 5 | 5 |
| | (XIII) | C$_3$H$_7$—(H)—(H)—COO—◯—F | | 5 | | |
| Third Liquid Crystal Material | (XV) | C$_4$H$_9$—(H)—◯—COO—◯(CN)(CN)—OC$_4$H$_9$ | 2 | 2 | 2 | 4 |

TABLE 4-continued

| Liquid crystal compound | Example No. (% by weight) | | | |
|---|---|---|---|---|
| | 12 | 13 | 14 | 15 |
| C₃H₇—⟨H⟩—⟨○⟩—COO—⟨○⟩(CN,CN)—OC₂H₅ | 3 | 3 | 3 | 3 |
| C₂H₅—⟨H⟩—⟨○⟩—COO—⟨○⟩(CN,CN)—OC₃H₇ | 3 | 3 | 3 | 3 |
| Fourth Liquid Crystal Material (XVI) C₅H₁₁—⟨H⟩—COO—⟨○⟩—F | | | | 5 |
| C₇H₁₅—⟨H⟩—COO—⟨○⟩—F | | | | 5 |

TABLE 5

| Example No. | 12 | 13 | 14 | 15 |
|---|---|---|---|---|
| fc at 23° C. (kHz) | 13.5 | 17.0 | 14 | 19.5 |
| Viscosity at 25° C. (cp) | 79 | 87 | 93 | 83 |
| Δε (200 Hz) | +6.5 | +7.2 | +7.1 | +6.7 |
| Δε (100 kHz) | −3.6 | −3.5 | −3.6 | −3.4 |
| N-I point (°C.) | 119.0 | 120.2 | 122.7 | 112.6 |

EXAMPLES 16-21

The liquid crystal compounds indicated in Table 6 were mixed in the amounts shown therein to prepare 6 types of liquid crystal compositions. Two dyes of the following formulas were added, as dichroic dyes, to each of these liquid crystal compositions in the amount of 1.2% by weight each so as to prepare guest-host liquid crystal compositions:

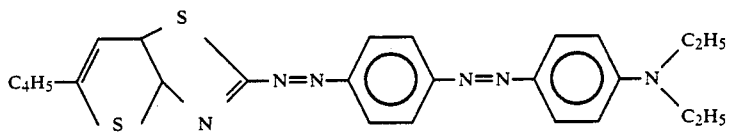

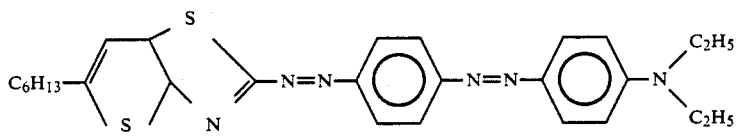

The guest-host liquid crystal compositions were assembled in liquid crystal shutter devices which were, in turn, mounted on optical printers. The shutter characteristics of the devices were then tested. The liquid crystal shutter devices were driven under the following conditions: Vop=25 V, T1=2 ms, T2=T3=1 ms, low drive frequency: 5 kHz, high drive frequency: 320 kHz, and temperature: 20° to 30° C. The light sources of the optical recording portions of the printers had a light-emission band of 543±20 nm, and the dichroic dyes used had an absorption band of 560±40 nm. The obtained results are shown in Table 7.

TABLE 6

| Liquid crystal compound | Example (wt %) | | | | | |
|---|---|---|---|---|---|---|
| | 16 | 17 | 18 | 19 | 20 | 21 |
| 1  C₃H₇—⟨H⟩—COO—⟨○⟩—OC₂H₅ | 8 | 7 | 18 | 11 | 19 | 8 |

TABLE 6-continued
| | Liquid crystal compound | Example (wt %) 16 | 17 | 18 | 19 | 20 | 21 |
|---|---|---|---|---|---|---|---|
| 2 | 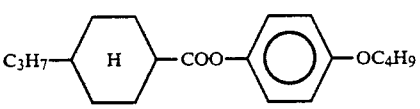 | 8 | 7 | 18 | 11 | 18 | 8 |
| 3 | 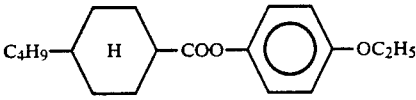 | 7 | 7 | 17 | 10 | 18 | 7 |
| 4 | 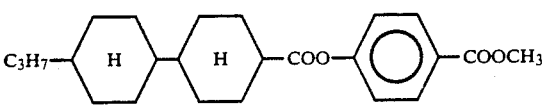 | 10 | 7 | | 10 | | 12 |
| 5 | 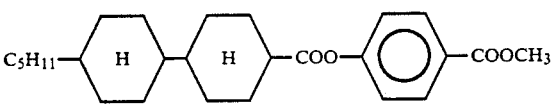 | 10 | 7 | | 10 | | 12 |
| 6 | 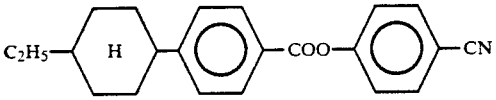 | 5 | 8 | 6 | 6 | | 5 |
| 7 | 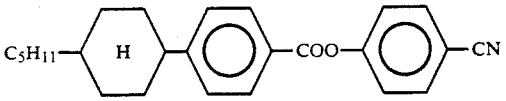 | 5 | 7 | 6 | 6 | 10 | 5 |
| 8 | 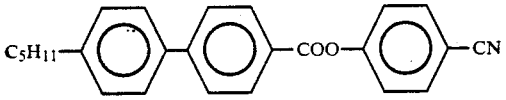 | 5 | 7 | 6 | 5 | 5 | 5 |
| 9 | 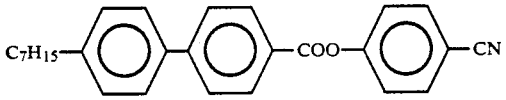 | 5 | 6 | 6 | 5 | 5 | 5 |
| 10 | 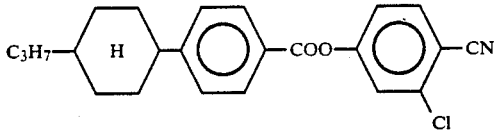 | 5 | | | | | |
| 11 | 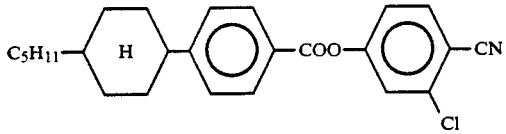 | 5 | | | | | |
| 12 | 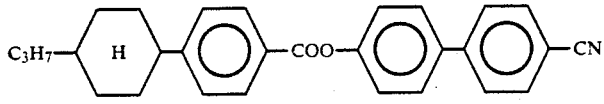 | | | | | | 7 |
| 13 | 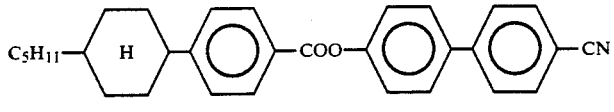 | | | | | | 7 |

TABLE 6-continued

| | Liquid crystal compound | Example (wt %) | | | | | |
|---|---|---|---|---|---|---|---|
| | | 16 | 17 | 18 | 19 | 20 | 21 |
| 14 | C$_3$H$_7$—[H]—[H]—COO—[○]—F | 8 | 8 | 7 | 8 | 8 | 8 |
| 15 | C$_5$H$_{11}$—[H]—[H]—COO—[○]—F | 7 | 7 | 7 | 7 | 7 | 7 |
| 16 | C$_3$H$_7$—[H]—[○]—COO—[○](CN)(CN)—OC$_4$H$_9$ | 3 | 4 | 3 | 4 | 5 | 2 |
| 17 | C$_3$H$_7$—[H]—[○]—COO—[○](CN)(CN)—OC$_3$H$_{11}$ | 3 | 4 | 3 | 4 | 5 | 2 |
| 18 | C$_5$H$_{11}$—[H]—[○]—COO—[○](CN)(CN)—OC$_4$H$_9$ | | 3 | 4 | 3 | 3 | |
| 19 | C$_2$H$_5$—[H]—[○]—COO—[○](CN)(CN)—OC$_3$H$_7$ | | | | 3 | | |
| 20 | C$_5$H$_{11}$—[H]—COO—[○]—F | | | | | 5 | |
| 21 | C$_7$H$_{15}$—[H]—COO—[○]—F | | | | | | 5 |

TABLE 7

| Example | fc (kHz) | ΔεL | ΔεH | \|ΔεL\|/\|ΔεH\| | Time for switching open to close (msec) | Shutter characteristic | Evaluation |
|---|---|---|---|---|---|---|---|
| 16 | 19 | +6.9 | −4.3 | 1.60 | 0.34 | Stable and good shutter characteristic | o |
| 17 | 19 | +6.0 | −3.7 | 1.62 | 0.40 | | |
| 18 | 18.5 | +5.3 | −3.6 | 1.47 | 0.40 | Slightly poor response | Δ |
| 19 | 18 | +3.9 | −3.8 | 1.03 | 0.40 | Poor response in shutter open mode due to high frequency hysteresis effect; Unstable shutter open/close level | Δ |
| 20 | 10.5 | +3.7 | −3.6 | 1.03 | 0.40 | | |
| 21 | 9 | +4.1 | −2.2 | 1.86 | 0.42 | Slightly poor response in shutter close mode | Δ |

As can be seen from Table 7, the liquid crystal shutter devices in which the compositions of Examples 16 to 21, containing the dichroic dyes, are assembled have very short switching times of less than 0.5 ms from the open to close state. Such short switching times are obtained because the liquid crystal compositions have large absolute values of dielectric anisotropies ΔεH of 2.0 or more at a high frequency.

When the absolute values of dielectric anisotropies ΔεH at a high frequency fH of the compositions are large, the switching times from the open to close state are short. However, normally, the high-frequency hysteresis effect is enhanced, and switching times from the close to open state are prolonged such that shutter response and stability are impaired. However, the compositions of Examples 16 to 21 have dielectric anisotropies ΔεL at a low frequency of 3.5 or more, and have ratios |ΔεL|/|ΔεH| exceeding one. Therefore, the adverse influence of the high-frequency hysteresis effect can be prevented.

In order to suppress the high-frequency hysteresis effect, the ratio |ΔεL|/|ΔεH| should, preferably, be high. However, in order to increase this ratio, the content of second liquid crystal material must be increased. The resultant composition has a high viscosity and is impractical. In view of this, the ratio needs, preferably, to be 5 or less.

As shown in Table 7, the liquid crystal shutter devices having the compositions of Examples 16 and 17 have the best shutter characteristics, while those of Examples 18 and 21 have the next best shutter characteristics. It can be seen from this that the compositions used in two frequency driven liquid crystal devices have the ratio |ΔεL|/|ΔεH| within, preferably, the range of 1.2 to 5. The liquid crystal devices in which the compositions of Examples 19 and 20 are assembled have shutter characteristics inferior to those of other Examples, but are, nonetheless, better than those devices in which conventional compositions are assembled.

As described above, when the liquid crystal compositions of the present invention are driven by the two frequency addressing scheme, they are less prone to the high-frequency hysteresis effect, can be driven at low voltages, and have quick responses.

What is claimed is:

1. A liquid crystal composition, comprising:
a first liquid crystal material comprising 20 to 70% by weight, based on the total weight of the composition, of at least one liquid crystal compound of the formula:

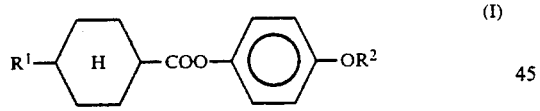

(I)

wherein each of $R^1$ and $R^2$ is independently an alkyl group having 1 to 8 carbon atoms;
a second liquid crystal material comprising 30 to 49% by weight, based on the total weight of the composition, of at least three kinds of liquid crystal compounds selected from compounds of the formulas:

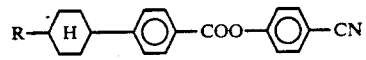

(VII)

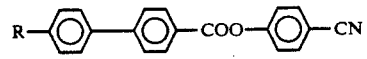

(VIII)

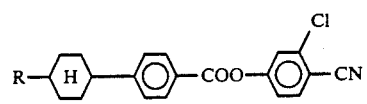

(IX)

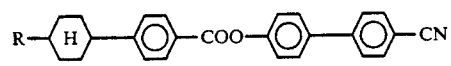

(XI)

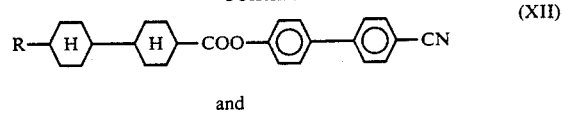

(XII)

and

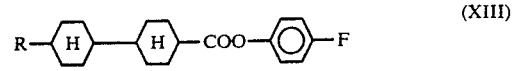

(XIII)

wherein R is independently an alkyl group having 1 to 8 carbon atoms, the amounts of compounds (VII), (VIII), (IX), (XI), (XII) and (XIII), based on the total weight of the composition, being up to 20% by weight, up to 20% by weight, up to 10% by weight, up to 20% by weight, up to 10% by weight, and up to 20% by weight, respectively; and
a third liquid crystal material comprising 2 to 15% by weight, based on the total weight of the composition, of one kind of liquid crystal compound selected from compounds of the formulas:

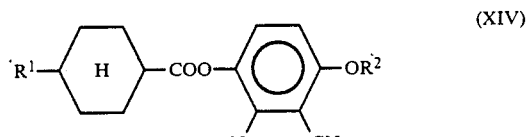

(XIV)

and

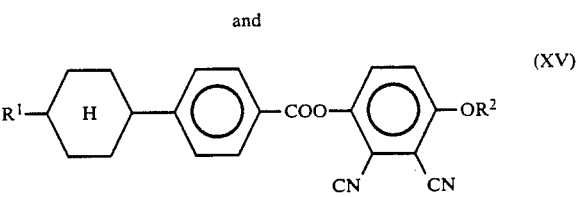

(XV)

wherein each of $R^1$ and $R^2$ is independently an alkyl group having 1 to 8 carbon atoms.

2. The liquid crystal composition according to claim 1, wherein said second liquid crystal material contains

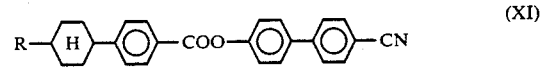

(XI)

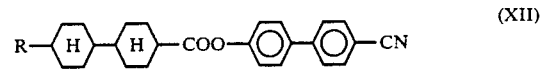

(XII)

and

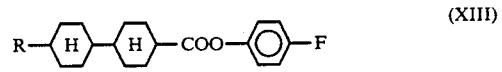

(XIII)

liquid crystal compounds of formulas (VII) and (VIII), and at least one kind of liquid crystal compound selected from the compounds of formulas (XI), (XII) and (XIII), the amounts of compounds (XI), (XII) and (XIII), based on the total weight of the composition, being up to 20% by weight, up to 10% by weight and up to 20% by weight, respectively.

3. The liquid crystal composition according to claim 2, wherein said second liquid crystal material consists of liquid crystal compounds of formulas (VIII), (VIII) and (XI).

4. The liquid crystal composition according to claim 2, wherein said second liquid crystal material consists of liquid crystal compounds of formulas (VII), (VIII) and (XIII).

5. The liquid crystal composition according to claim 2, wherein said second liquid crystal material consists of liquid crystal compounds of formulas (VII), (VIII), (XI) and (XII).

6. The liquid crystal composition according to claim 2, wherein said second liquid crystal material consists of liquid crystal compounds of formulas (VII), (VIII), (XI) and (XIII).

7. The liquid crystal composition according to claim 1, wherein said first liquid crystal material further contains up to 30% by weight, based on the total weight of the composition, of at least one compound of the formula:

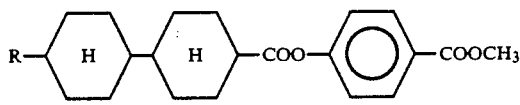

(II)

wherein R is an alkyl group having 1 to 8 carbon atoms, and said second liquid crystal material consists of liquid crystal compounds of formulas (VII), (VIII) and (XIII).

8. The liquid crystal composition accoridng to claim 1, wherein said first liquid crystal material further contains up to 30% by weight, based on the total weight of the composition, of at least one compound of the formula:

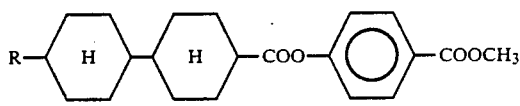

(II)

wherein R is an alkyl group having 1 to 8 carbon atoms, and said second liquid crystal material consists of liquid crystal compounds of formulas (VII), (VIII), (XI) and (XIII).

9. The liquid crystal composition according to claim 1, wherein said second liquid crystal material further contains liquid crystal compounds of formulas (VII), (IX) (XI) and (XIII), the amount of each of the compounds of formulas (XI) and (XIII), based on the total weight of the composition, being up to 20% by weight; and said third liquid crystal material contains the liquid crystal compound of formula (XIV).

10. The liquid crystal composition according to claim 1, wherein said second liquid crystal material contains liquid crystal compounds of formulas (VIII), (IX), (XI) and (XIII), the amount of each of the compounds of formulas (XI) and (XIII), based on the total weight of the composition, being up to 20% by weight; and said third liquid crystal material contains a liquid crystal compound of formula (XV).

11. The liquid crystal composition according to claim 1, wherein said first liquid crystal material further contains up to 30% by weight, based on the total weight of the composition, of at least one liquid crystal compound of the formula:

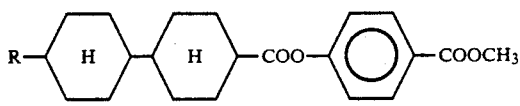

(II)

wherein R is an alkyl group having 1 to 8 carbon atoms; said second liquid crystal material contains liquid crystal compounds of formulas (VII), (VIII), (IX) and (XIII), the amount of the compound of formula (XIII), based on the total weight of the composition, being up to 30% by weight; and said third liquid crystal material contains a liquid crystal compound of formula (XV).

12. The liquid crystal composition according to claim 2, further comprising up to 30% by weight, based on the total weight of the composition, of a fourth liquid crystal material containing at least one liquid crystal compound of the formula:

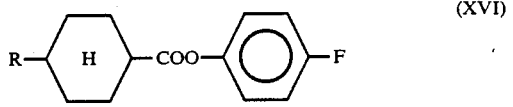

(XVI)

wherein R is an alkyl group having 1 to 8 carbon atoms.

13. The liquid crystal composition according to claim 1, wherein said first liquid crystal material further contains up to 30% by weight, based on the total weight of the composition, of at least one liquid crystal compound of the formula:

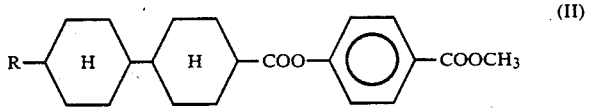

(II)

wherein R is an alkyl group having 1 to 8 carbon atoms, said second liquid crystal material consists of compounds of formulas (VII), (VIII) and (XIII), and said third liquid crystal material consists of the compound of formula (XV).

14. The liquid crystal composition according to claim 9, further comprising up to 15% by weight, based on the total weight of the composition, of a fourth liquid crystal material containing at least one liquid crystal compound of the formula:

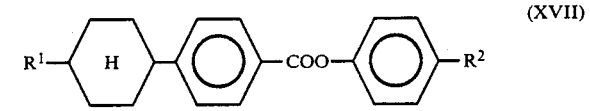

(XVII)

wherein each of $R^1$ and $R^2$ is independently an alkyl group having 1 to 8 carbon atoms.

15. The liquid crystal composition according to claim 1, wherein said first, second and third liquid crystal materials are mixed such that the dielectric anisotropy $|\Delta\epsilon L|$, measured by applying to the composition waves of a low frequency which is one-tenth of the cross-over frequency of the composition, has an absolute value greater than the dielectric anisotropy $|\Delta\epsilon H|$ measured by applying to the composition waves of a high frequency which is ten times higher than the cross-over frequency of the composition.

16. The liquid crystal composition according to claim 15, wherein the absolute value of said dielectric anisotropy $\Delta\epsilon L$ is 3.5 or more; and the absolute value of said dielectric anisotropy $\Delta\epsilon H$ is 2.0 or more; and ratio of $\Delta\epsilon L/\Delta\epsilon H$ is 1.2 to 5.

17. A liquid crystal composition according to claim 1, wherein said second liquid crystal material consists essentially of liquid crystal compounds of formulas (VII) and (VIII) in a total amount of 18 to 28% by weight, based on the total weight of the composition.

18. A liquid crystal composition according to claim 17, wherein said liquid crystal compounds of formulas (VII) and (VIII) are contained in a total amount of 20 to 28% by weight, based on the total weight of the composition.

19. A liquid crystal composition according to claim 1, wherein said liquid crystal compounds of formulas (VII) and (VIII) are contained in a total amount of 10 to 28% by weight, based on the total weight of the composition.

20. A liquid crystal composition according to claim 1, wherein said second liquid crystal material consists essentially of liquid crystal compounds of formulas (VII), (VIII) and (XIII).

* * * * *